Sept. 24, 1940.    R. E. PECK    2,216,046
AIR CONDITIONING CONDUIT FITTING
Filed April 12, 1937
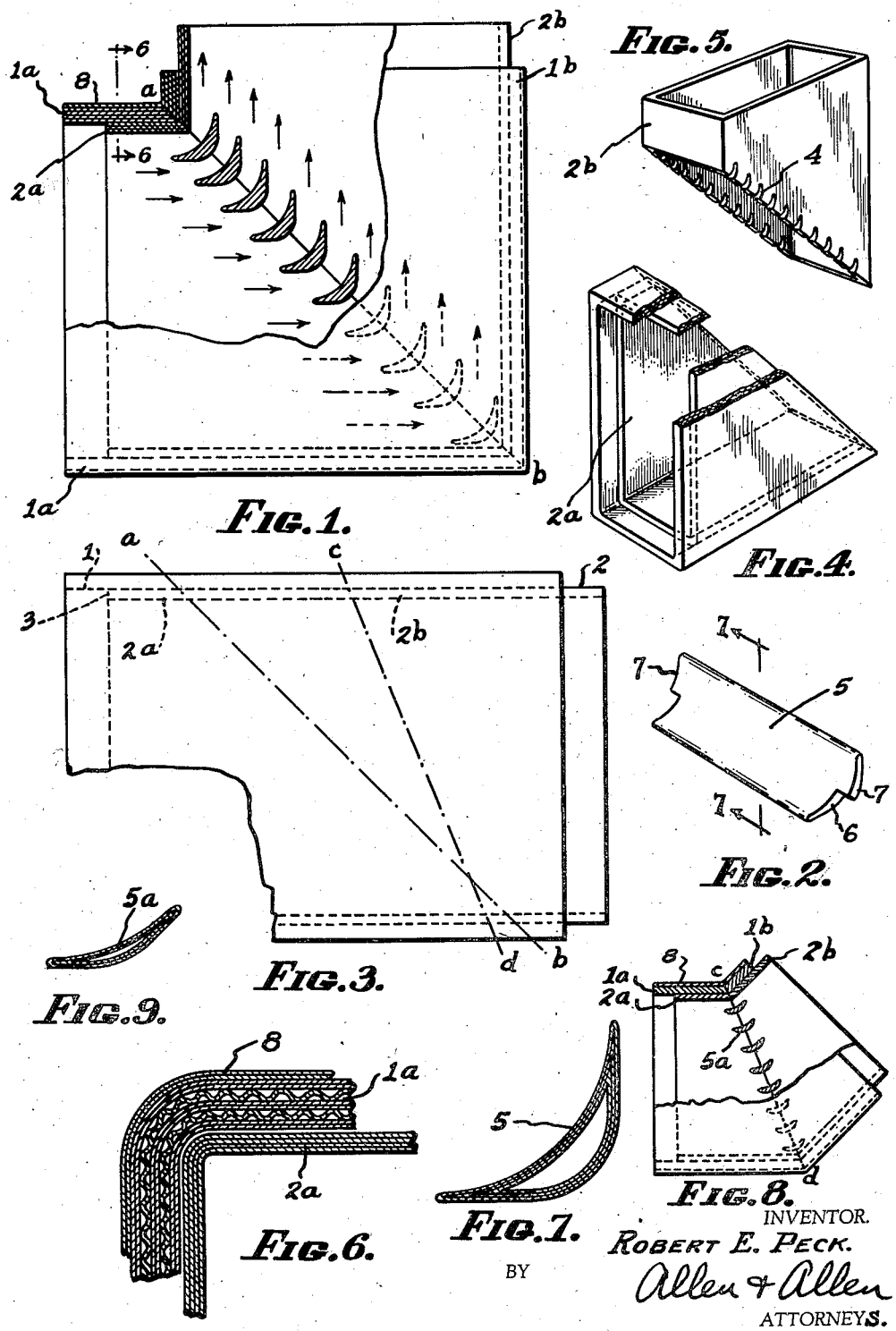
INVENTOR.
ROBERT E. PECK.
BY Allen & Allen
ATTORNEYS.

Patented Sept. 24, 1940

2,216,046

UNITED STATES PATENT OFFICE 2,216,046

AIR CONDITIONING CONDUIT FITTING

Robert E. Peck, Cincinnati, Ohio

Application April 12, 1937, Serial No. 136,378

4 Claims. (Cl. 285—211)

My invention relates to the manufacture of air conditioning conduit fittings and duct turns such as elbows, "30's," "45's", "60's," "90's" and register outlets.

In the use of conduits for air conditioning equipment such as is disclosed in my applications Serial No. 84,729 filed June 11, 1936, Serial No. 84,730 filed June 11, 1936, and Serial No. 84,731, filed June 11, 1936, I have disclosed conduit constructions wherein the capacity and shape of the flaring walls of the fitting accommodate the steady flow of the air currents without loss of velocity or undue friction.

It is the object of my invention as set forth herein to provide for fittings wherein the size of the fitting and the abruptness of the turns for which provision is made, is such that a wide flaring bend is not practical and wherein to prevent loss of velocity, vanes are inserted diagonally across the fittings which cause the currents of air moving through the conduit to be diverted without loss of velocity.

My invention specifically relates to improvements in conduit fittings for use in combination with conduit sections such as are described in my application Serial No. 84,731 filed June 11, 1936, wherein inner telescoping sections are used to provide strong and rigid section junctures.

In such a fitting it is one of my objects to utilize the straight section of conduit for making the fitting so that fittings do not require additional patterns and equipment but may be made up on the job if desired where fittings are required.

It is an object of my invention to provide a fitting which may be made from a straight section of conduit without in any way changing the edge joints of the straight sections connected to the fittings, and which will be resistant to bursting and collapsing strain to a degree similar to the resistance of the straight sections of conduit. Thus it is my object to provide assembled conduits wherein the dimensions of the fittings will correspond to the dimensions of the straight sections and where economy of construction and installation will result.

It is my object to provide a method of air duct installation in which the velocity of air may be stepped up from 500 cu. ft. per minute, a normal velocity in metal conduits, to from 2000 to 3000 cu. ft. per minute without any disadvantage such as sound vibration.

The above objects and other structural advantages and improvements I obtain by that combination and arrangement of parts of which I have illustrated a preferred embodiment.

Referring to the drawing:

Figure 1 is a plan view with parts in section showing a right angle fitting extending in a horizontal plane.

Fig. 2 is a perspective view of a velocity equalizing vane such as is illustrated in plan view in Fig. 1.

Fig. 3 is a plan view of a section of conduit material with a line indicating the line of cut by which a right angle fitting may be made therefrom.

Fig. 4 is a perspective view of one of the sections which is formed by cutting the section in Fig. 3 along the diagonal line indicated.

Fig. 5 is a perspective view of the complementary inner section only, formed from cutting the section shown in Fig. 3 along the diagonal line indicated.

Fig. 6 is a sectional view along the line 6—6 of Fig. 1.

Fig. 7 is a sectional view of the vane illustrated in Fig. 2 along the line 7—7.

Fig. 8 is a plan view of a 45° fitting with parts in section.

Fig. 9 is a sectional view of a velocity equalizing vane such as may be employed in a fitting such as is illustrated in Fig. 8.

Referring first to Fig. 3, the conduit section illustrated is composed of an outer section 1 of fibrous material, such as asbestos, spun in composite corrugated layers extending lengthwise of the section. The outer section 1 has an inner section 2 formed of compressed fibrous material having sufficient rigidity and strength so that when it is telescoped into a position in which one end protrudes from the outer section, it will form an interlocking joint with another section of material having an inner section telescoped slightly out of registry with the outer section, so that a recessed annular portion 3 is formed within which the protruding end of the outer section will fit.

The composite section to form a right angle fitting or bend is cut or sewed along the diagonal line illustrated at $a, b$. The two sections of the inner section 2 indicated at $2a$ and $2b$ are then removed from the outer sections and the section $2a$ has its diagonally cut edges provided with crescent shaped serrations 4.

A velocity equalizing vane 5 may be formed from fibrous material formed about a form of a shape corresponding to the open shape within the vane. The ends of the vane are cut off as indicated at 6, forming protruding end portions 7 which are interlocked in the crescent shaped serrations 4 in the inner section 2a. Adhesive may be provided to thoroughly bind the vanes within the section 2a.

The inner section 2b is then set against the section 2a with the diagonally cut edges in registry, and adhesive is applied to secure the meeting edges together.

The two outer sections 1a and 1b are then fitted together and close the inner sections. Bands of flexible material 8 are then wrapped around the outer surface of the sections 1a and 1b to join them securely together. It may be found advisable to secure the outer sections together by inserting metal cleats. In my application Serial No. 84,730 filed June 11, 1936, I have illustrated a wide variety of cleats and fastening devices which will be available for securing the outer sections together. In Fig. 8 I have illustrated a fitting of conduit in which the angle of bend is about 45°. Such a fitting is formed in exactly the same manner as I form the 90° fitting, by cutting the composite section illustrated in Fig. 3 along the line c, d and assembling the fitting in the manner described. In the 45° fitting the velocity equalizing vanes are of the shape illustrated at 5a in Fig. 9.

I have not explained the geometric method of arriving at the curvature of the front and back of the velocity equalizing vanes because the formula for manufacturing such vanes is old and well known in connection with heating and ventilating engineering. The particular method of making the vanes in the form of a hollow shell composed of layers of fibrous material, as far as I am advised, represents a new departure in this art.

Having thus described my invention, what I claim as new and desire to secure by Letters Patent is:

1. A fibrous fitting for use in conduit construction comprising two elements, each having inner and outer sections, and each having an end edge extending diagonally of its length, said edges fitted together to form a desired angle fitting, vanes secured along the meeting edge of the inner sections to direct air currents through the fitting and means for securely binding said two elements together.

2. A fibrous fitting for use in conduit construction comprising two elements, each having inner and outer sections, and each having an end edge extending diagonally of its length, said edges fitting together to form a desired angle fitting, vanes secured along the meeting edge of the inner sections to direct air currents through the fitting and means for securely binding said two elements together, the edges of the inner sections opposite the meeting edges being out of registry with the edges of the outer sections opposite the meeting edges thereof.

3. A fibrous fitting for use in conduit construction comprising two elements, each having inner and outer sections, and each having an end edge extending diagonally of its length, said edges fitted together to form a desired angle fitting, vanes secured along the meeting edge of the inner sections to direct air currents through the fitting and means for securely binding said two elements together, said vanes having attachment portions and a wall of an inner section slitted along its diagonally extending edge to receive said vane attachment portion.

4. A fibrous fitting for use in conduit construction comprising two elements, each having inner and outer sections, said inner and outer sections having end edges extending diagonally of their length, said diagonal edges of both inner and outer sections fitted together forming a desired angular fitting, air direction vanes secured and retained in permanent position at the meeting diagonal edges of the inner sections and means binding said two elements together.

ROBERT E. PECK.